April 30, 1946.  H. KLOPSTOCK ET AL  2,399,356
METHOD OF WELDING PLATES
Filed March 23, 1943
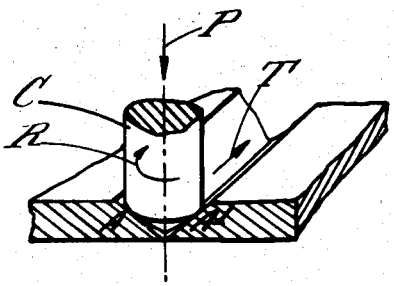
INVENTORS:
HANS KLOPSTOCK
ABRAM RUPERT NEELANDS
BY Robert S. Waters
ATTORNEY.

Patented Apr. 30, 1946

2,399,356

UNITED STATES PATENT OFFICE 2,399,356

METHOD OF WELDING PLATES

Hans Klopstock, London, and Abram Rupert Neelands, Doncaster, England

Application March 23, 1943, Serial No. 480,159½
In Great Britain October 17, 1941

1 Claim. (Cl. 113—112)

This invention relates to the welding of metal plates. The invention has for its purpose the welding together of metal plates along a seam by utilizing frictionally developed heat and is based on the principle that if a rod or bar of suitable metal is rotated under pressure in contact with the metal parts to be welded the frictional heat developed will cause the end of the rod or bar to become plastic and melt and fill the space between the parts to be welded and unite with their surfaces the bonding operation being assisted or completed by the melting or partial melting of the parts to be joined as a result of the frictional movement of the rod or bar relatively thereto. In other words the frictional heat softens and melts the surfaces of the metal parts to be joined, which facilitates the deposit and intermolecular penetration of the molten rod metal.

The primary object of the present invention is to utilize this principle in the welding together of metal plates such for example as mild steel plates and the invention accordingly consists in a method of welding plates along a seam according to which the adjacent edges of the plates are chamfered to form a trough between them and a rod of welding metal is rotated in the trough and in contact with the chamfered faces of the plates at such speed and is simultaneously fed forward under such pressure that the frictional heat developed raises the metal plates and the operative end of the rotating rod to molten condition, whereby the molten metal deposited along the trough from the end of the rotating rod as it advances along the seam amalgamates with the molten metal of the plates so that on cooling a homogeneous bond between the plates is achieved along the seam.

The metal rod may be moved relatively to the metal plates to be welded whilst under pressure and rotating or the rod may remain stationary and the work moved about as may be required. Furthermore, as the material of the rod becomes used up by deposition on the metal part or parts under treatment, it is fed forward against the work so as to maintain the requisite pressure to produce the frictional heat required to maintain the end of the rod in a molten condition.

The frictional heating action may be supplemented by external heating means, as, for example, an oxy-acetylene blow pipe, a carbon or metal arc, electric heating coils, gas jets, torches or the like.

In addition to the frictional heat reducing the metal of the rod or bar into molten form at its end, the rotation and pressure will also promote the intermolecular penetration between the rod metal and the metal under treatment, so that a structural bond is brought about.

As soon as sufficient heat has been generated by friction to make the end of the rod and/or the bearing surface or surfaces plastic, the pressure may be reduced so that only sufficient heat is produced to maintain the required degree of fusibility of the rod and plasticity of the parts to be joined. On the other hand provision may be made for increasing the pressure should circumstances call for this, i. e. should the metals under treatment be particularly hard and resistant to wear.

The invention is diagrammatically set forth in the accompanying drawing illustrating the operation of welding together two metal plates by means of the steel welding rod C. The seam or trough should be preferably a V or U shape with an obtuse angle which should not be less than 90 degrees, the depth of the seam being equal to the thickness of the sheets to be joined. The steel welding rods used for the prescribed purpose have, besides a certain content of carbon, preferably an increased content of manganese and silicon, as there is a loss of some of the constituents of the filling rod during the welding operation. The increased amount of manganese and silicon supports the deoxidization of the molten metal and increases the fluidity and tensile strength of the weld. When carrying out the actual welding procedure, the end of the welding rod C can be chamfered, having an angle slightly smaller than the angle of the groove, but alternatively can be straight. When using chamfered rods of any section (which may also have grooves) the diameter of the rod is equal to or less than that of the opening to be filled; the staving up of the rod material (that is, the part of the rod which is not deposited being pressed out around the rod in an upward direction into a mushroom shape) can thus be avoided, thus depositing the full amount of rod material on the parent metal surface, and (when using grooved rods) at the same time providing space for the fluxing paste, which should preferably cover the whole rod. The rod is kept at right angles to the groove, the chamfered or straight end touching the sides of the groove at points A—A'. The arrow P indicates the direction of pressure on the rod, the arrow R the direction of its rotation, and the arrow T the direction of traverse. When rotating the rod and pressing the chamfered end tightly into the groove the first contact between the rotating rod and the sheets is made on the line A—A' thus ensuring high intensity of pressure between the contacting surfaces. In order to guarantee the fullest possible deoxidization while depositing the melted rod material, a compound flux may be used which may comprise copper and pure iron in powdered form, ferric oxide, manganese dioxide, potassium or sodium permanganate, potassium chloride, sodium borate, sodium sulphate, potassium fluoride, or the like.

By rotating under pressure the vertical welding rod with the chamfered end in the V groove of the metals to be joined, the heat is quickly developed at the points of contact by friction and changes the state of the metal at the rubbing surfaces into a plastic state, whereby greater parts of the three surfaces are brought into contact. Increased friction increases the heat to such an extent that parts of the rod are melted off and deposited in the groove to fill it, the bond between the metal deposited by the rod and the two plates taking place by intermolecular penetration.

The rubbing action, which is preferably continuous, but may be intermittent to a certain degree, is not discontinued at the phase at which the moving and stationary parts begin to bond, but is continued until the desired effect is fully obtained; and the action in some cases is improved by the combination, with the normal friction, of impact, that is, by an intermittent rapid increase and decrease of pressure directly or indirectly applied to the moving part, or to both parts equally at the same time.

A substantial advantage compared with the normal welding method is that the heat is generated at the point of contact of the rubbing metal surfaces, thus saving a considerable amount of energy which otherwise is lost due to radiation of heat and other causes.

It will be seen that as soon as sufficient heat has been generated by friction to make the bearing surfaces plastic the pressure can be reduced. On the other hand, the pressure between the two rubbing surfaces has to be increased—or suitable preheating arrangements must be made—if the hardness and resistance to wear of the metals is increased.

The quality of the bond can be improved by using the flux, of composition as mentioned above. This flux, which is preferably put on the surface of the rod at the chamfered end, starts to melt when the melting points of the ingredients composing it are reached. As the melting points of copper and iron powder, as well as of the other components, are lower than the melting point of mild steel, these components will be melted first, thus initiating the bond of the metals and ensuring good contact by deoxidizing the bearing surfaces.

Another substantial advantage of this method compared with the normal oxy-acetylene welding process is that the bonding between the two metals is carried out under pressure, thus refining the grain of the weld, but also improving the structure of the adjacent parts which are brought to a plastic state when the bond takes place. The temperature of the metal of the plates does not necessarily require to be raised to melting point, as the pressure promotes the intermolecular penetration of the crystals, which otherwise has to be achieved by melting the metals.

The use of the present invention in connection with the electric and gas welding methods has the advantage that the amount of electrical or heat energy produced by the transformer or the gas flame can be considerably reduced. A good bond will be obtained when applying for instance the metallic arc welding method in combination with the present invention when welding cast iron, using rotating cast iron rods, the melted deposit of which will show the structural bond between similar metals, which up to now has never been obtainable with the normal metallic arc welding method using steel electrodes. Also the welding of brass, aluminium and other cast alloys can be achieved in the above described manner. The same applies also advantageously to the welding of steel and steel alloys as well as to the depositions of hard metal alloys.

Other auxiliary heating arrangements might include the use of electrical heating coils, gas jets, blow-pipes, torches and the like to heat the rod and the parent metal to be joined thus accelerating the melting and depositing of the molten rod on the surface of the main or parent metal.

By using the process in connection with the oxy-gas flame an improved structure is obtained compared with that of the ordinary gas weld, owing to the refinement of the grain of the metal by pressure.

What we claim and desire to secure by Letters Patent of the United States is:

A method of welding plates along a seam according to which the adjacent edges of the plates are chamfered to form a trough between them and a rod of welding metal is rotated in the trough and in contact with the chamfered faces of the plates at such speed and is simultaneously fed forward under such pressure that the frictional heat developed raises the metal plates and the operative end of the rotating rod to molten condition, whereby the molten metal deposited along the trough from the end of the rotating rod as it advances along the seam amalgamates with the molten metal of the plates so that on cooling a homogeneous bond between the plates is achieved along the seam.

HANS KLOPSTOCK.
ABRAM RUPERT NEELANDS.